United States Patent [19]
Michalik

[11] Patent Number: 6,007,713
[45] Date of Patent: Dec. 28, 1999

[54] SELF-CLEANING UNDERGRAVEL FILTER

[76] Inventor: Lee Michalik, 2611 Glasgow St., Joliet, Ill. 60435

[21] Appl. No.: 09/066,177

[22] Filed: Apr. 24, 1998

Related U.S. Application Data

[60] Provisional application No. 60/049,873, Jun. 17, 1997.

[51] Int. Cl.⁶ .................................................. E04H 3/16
[52] U.S. Cl. ........................ 210/169; 210/271; 210/416.2
[58] Field of Search ................................. 210/169, 416.2, 210/271, 109

[56] References Cited

U.S. PATENT DOCUMENTS

| | | |
|---|---|---|
| 2,081,597 | 5/1937 | Nowak . |
| 3,722,685 | 3/1973 | Orensten et al. . |
| 3,759,223 | 9/1973 | D'Andrea . |
| 3,785,342 | 1/1974 | Rogers . |
| 4,401,576 | 8/1983 | Meurer ................................. 210/416.2 |
| 4,581,075 | 4/1986 | St. Martin .............................. 210/169 |
| 4,615,802 | 10/1986 | Harbaugh ............................. 210/169 |
| 4,725,353 | 2/1988 | Whitman . |
| 4,733,427 | 3/1988 | Conrad . |
| 4,752,388 | 6/1988 | Ng . |
| 4,921,614 | 5/1990 | Frickman et al. . |
| 4,957,623 | 9/1990 | Henzlik . |
| 5,066,394 | 11/1991 | Harrison . |
| 5,179,911 | 1/1993 | Chow et al. . |
| 5,338,446 | 8/1994 | Schuman et al. ....................... 210/169 |

FOREIGN PATENT DOCUMENTS

| | | |
|---|---|---|
| 3048-479 | 12/1980 | Germany . |
| 2 105 977 | 4/1983 | United Kingdom . |
| 88/04524 | 6/1988 | WIPO . |

Primary Examiner—David A. Simmons
Assistant Examiner—Chester T. Barry
Attorney, Agent, or Firm—Richard C. Litman

[57] ABSTRACT

An undergravel filter system for removing particulate debris and organic waste from an aquarium environment. The system comprises a screen structures which are sized and configured to completely cover the bottom of an aquarium, a cleaning element slidably mounted under the screen structure, and a suction tube extending upward from the screen structures. Each screen structure has a porous top adapted to support a layer of gravel thereon in spaced relation to the bottom of an aquarium and to allow water and debris to fall therethrough into a debris receiving space. The cleaning elements may be moved back and forth within the debris receiving space to wipe off debris collected on the top screen structure and the bottom of the aquarium and push it towards at suction tube which removes the debris from the aquarium.

8 Claims, 4 Drawing Sheets

6,007,713

SELF-CLEANING UNDERGRAVEL FILTER

CROSS-REFERENCE TO RELATED APPLICATION

This application claims the benefit of U.S. Provisional Patent Application Ser. No. 60/049,873, filed Jun. 17, 1997.

BACKGROUND OF THE INVENTION

1. Field of the Invention

The present invention relates to an aquarium filter system. More specifically, the invention relates to a self-cleaning undergravel filter system.

2. Description of Related Art

When maintaining an aquarium it is necessary to periodically remove the particulate debris and organic wastes produced by the fish and aquatic plants in the aquarium in order to maintain a healthy environment for the fish and plants. One common way of accomplishing this is to use an undergravel filter system wherein a screen is placed in the tank so that it is supported just above the bottom thereof. A layer of gravel or similar rock material is then placed on the screen to collect the debris and organic wastes which settle toward the bottom of the tank. Additionally, a means for circulating the water downward through the layer of gravel or similar rock material and the screen is sometimes employed.

When an undergravel filter is in use, the gravel bed acts to filter out the particulate debris and organic wastes in the water while aerobic bacteria within the filter bed convert much of the waste into non-toxic gases. This process in not perfect; the particulate debris and organic waste will eventually collect on the screen and the bottom of the tank in sufficient quantities to affect the environment of the aquarium. This necessitates periodic cleaning of the screen and the bottom of the tank.

Traditionally this requires that the fish and aquatic plants be removed from the tank along with the gravel and screen structure so that the bottom of the tank and the screen structure may be cleaned. Several undergravel filter systems which provide a means for self-cleaning to avoid this inconvenience have been disclosed in the prior art.

U.S. Pat. No. 4,921,614, issued May 1, 1990 to Frickman et al., discloses an undergravel filter system having a slidable cleaning element extending across the width of the tank between the screen structure and the bottom of the tank. The cleaning element pushes the debris collected between the screen and the bottom of the tank to a conduit which draws water and the debris out of the tank where it is disposed or otherwise filtered and returned to the tank. The cleaning element used with the system of Frickman et al. has a metallic bar therein which allows the bar to be moved across the bottom of the tank by a magnetic source such as a hand held magnet placed against the bottom of the tank. While it is generally effective, this means of moving the cleaning element is not practical when the bottom of the tank is not readily accessible as is often the case with domestic aquariums.

U.S. Pat. No. 4,957,623, issued Sep. 18, 1990 to Joseph C. Henzlik, discloses another undergravel filter system having a slidable cleaning element extending across the width of the tank between the screen structure and the bottom of the tank. The cleaning element in the system of Henzlik is in the form of a suction head connected to a siphon tube that urges the suction head across the bottom of the tank as the siphon tube is fed down into the tank through a guide tube. The suction head is generally effective at removing debris from the bottom of the tank, but it does not clean the screen structure.

U.S. Pat. No. 5,197,911, issued Jan. 19, 1993 to Hong-Jien Chow and Yi-Min Jian, discloses a fish tank having an undergravel filter system that has a means for flushing the water and debris from the space between the screen structure and the bottom of the tank. This is accomplished by forcing water into one end of the space between the screen structure and the bottom of the tank through a feed tube and drawing the water out of the opposite end of the space through a tube system leading out of the bottom of the tank.

U.S. Pat. No. 3,759,223, issued Sep. 18, 1973 to Robert D'Andrea, discloses an aquarium including an undergravel. filter system that has a unique structure that allows water and debris collected in the space between the screen structure and the bottom of the tank to be drained for removal of debris from the tank. A drain spigot disposed through the side of the tank adjacent the bottom thereof allows this to be done with little. effort.

U.S. Pat. No. 3,722,685, issued Mar. 27, 1973 to Henry E. Orensten and Vivian C. Orensten, and U.S. Pat. No. 3,785, 342, issued Jan. 15, 1974 to George H. Rogers, disclose undergravel filter systems which each employ a pump and filter arrangement to draw the water and debris from between the screen structure and the bottom of the tank for cleaning before returning it to the tank. The system of Orensten returns the water directly to the space between the screen structure and the bottom of the tank so that the water in the tank has a unique circulation pattern while the system of Rogers simply returns the cleaned water to the top of the tank.

U.S. Pat. No. 4,752,388, issued Jun. 21, 1988 to Ying N. Ng, and U.S. Pat. No. 5,066,394, issued Nov. 19, 1991 to Mark R. Harrison disclose undergravel filter systems which have a means of inducing the water to flow through the layer of gravel and the screen structure, through the space between the screen structure and the bottom of the tank, and then back to the main body of the tank. The system of Harrison employs pumps and suction tubes disposed at opposite ends of the tank to induce flow, while the system of Ng induces flow by supplying pressurized air to a tube connecting the space between the screen structure and the bottom of the tank with the main body of the tank. By inducing the water to flow through the space between the screen structure and the main body of the tank, debris will collect there more slowly than undergravel filter systems without induced flow, thus cleaning is required less frequently.

Finally, several devices for scraping debris from an aquarium have been disclosed in the prior art, including U.S. Pat. No. 4,733,427, issued Mar. 29, 1988 to Richard H. Conrad, and U.K. Patent Number 2,105,977, published Apr. 7, 1983. The device of Conrad employs a brush mounted on the end of an elongate handle while the British document discloses a magnetically actuated elongate bar having scraping edges.

However, none of the prior art discloses an undergravel filter system which includes a slidable cleaning element extending across the width of the tank between the screen structure and the bottom of the tank which is actuated by an elongate handle extending from the top of the tank. Furthermore, none of the above inventions and. patents, taken either singly or in combination, is seen to describe the instant invention as claimed.

SUMMARY OF THE INVENTION

The present invention is an undergravel filter system which has an easy to use means for cleaning the filter system and remove particulate debris and organic waste from an aquarium environment. The system comprises at least one screen structure which is sized to completely cover the bottom of an aquarium, a cleaning element, and a suction tube. Two or more smaller screen structures may be used to cover the aquarium floor of larger aquariums, each structure having a corresponding cleaning element and suction tube. Each screen structure has a porous top adapted to support a layer of gravel thereon and four sidewalls extending downward therefrom to define a debris collecting space between the top of the screen structure and the bottom of the aquarium. The porous top is provided with a slot running between two opposed sidewalls. Each screen structure slidably supports a cleaning element therein which lies within and extends transversely across the debris collecting space perpendicular to the slot of the porous top.

Each cleaning element is adapted for actuation by an elongated handle. In one embodiment, a loop extending upward from the top surface of the cleaning element is provided. A hook attached to a distal end of the elongated handle is used to engage the loop. Alternatively, the top surface of the cleaning element defines an aperture. A cup-like flange extends upward from the aperture. A pivotally mounted pin is provided at the distal end of the elongated handle for engaging the cleaning element by insertion into the aperture. The loop or flange protrudes through the slot in the porous top so that the cleaning element may be engaged more easily. In either embodiment, the handle is used to engage the cleaning element for sliding the cleaning element whereby the top and bottom surfaces clean the porous top and aquarium floor, respectively, while depositing waste near the suction tube for removal. In order to remove the debris from the debris collecting space, the suction tube is disposed through the top of each screen structure into the debris collecting space adjacent the outer sides thereof to draw the water and debris therefrom for cleaning and/or disposal.

Accordingly, it is a principal object of the invention to provide a self-cleaning undergravel filter system.

It is another object of the invention to provide a self-cleaning undergravel filter system which utilizes a slidable cleaning element disposed between the screen structure and the bottom of the aquarium to wipe off the debris collected thereon.

It is a further object of the invention to provide an undergravel filter system which uses suction tubes to draw the water and debris from the space between the screen structure and the bottom of the aquarium for disposal and/or cleaning.

Still another object of the invention is to provide a undergravel filter system which utilizes a slidable cleaning element that may be actuated from the top of the tank by an elongated handle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
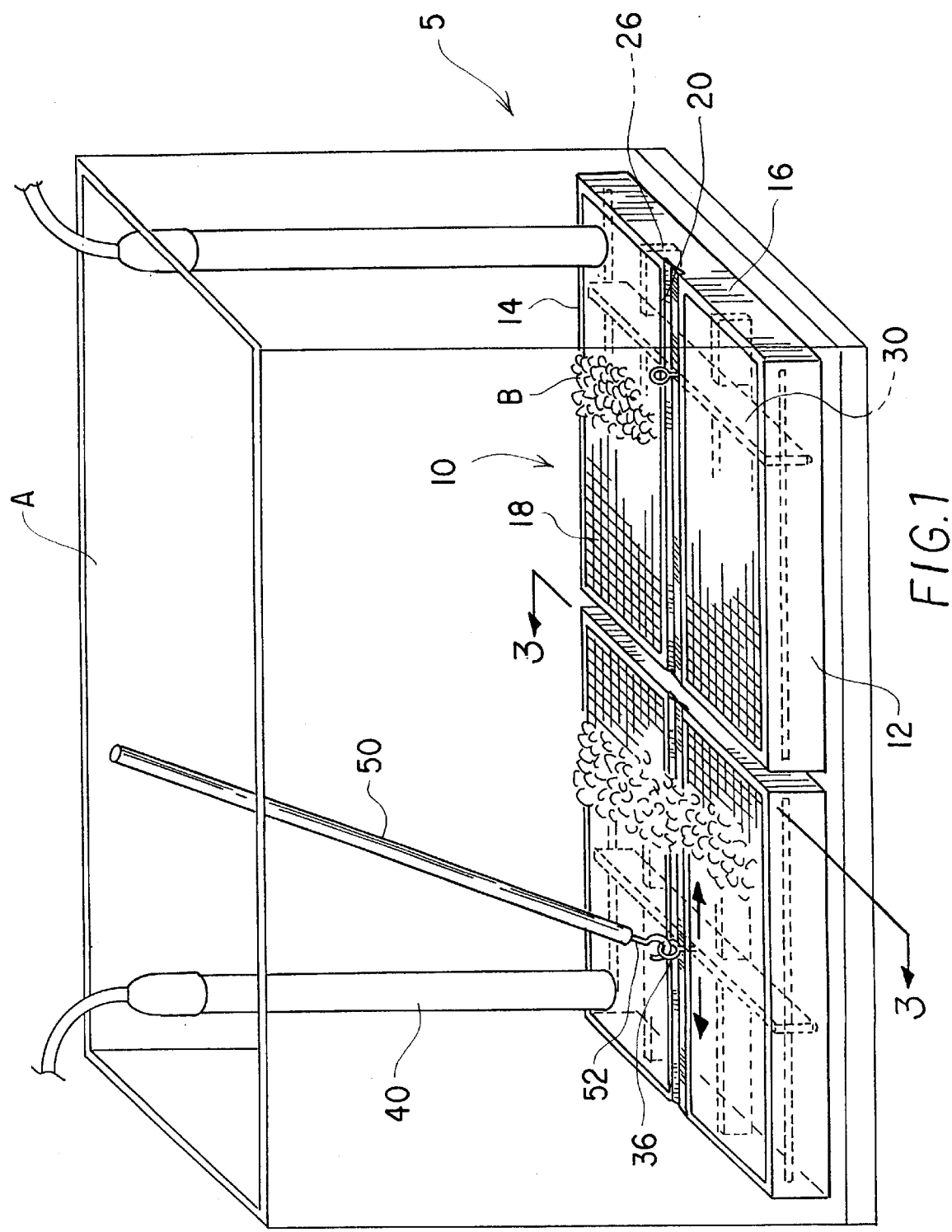
FIG. 1 is an environmental perspective view of the self-cleaning undergravel filter system of the present invention.

Referring to the drawings, FIG. 1 illustrates an undergravel filter system 5 of the present invention which is adapted to be installed into the bottom of an aquarium A to collect the particulate and organic debris produced therein. In its preferred embodiment, the undergravel filter system 5 generally comprises two identical screen structures 10, each having a slidable cleaning element 30 and a suction tube 40 attached thereto. It should be apparent, however, that a single screen structure 10 may be appropriate for some aquariums and more than two screen structures 10 may be appropriate for other aquariums. The size and configuration of each screen structure 10 is dependent, therefore, upon the size and configuration of the aquarium in which it is intended to be used. As shown in FIG. 1, the screen structures 10 are generally rectangular in shape and sized to be placed on the floor of the aquarium A in a side by side relationship with each other so that they completely cover the floor of the tank.

Figure 2:
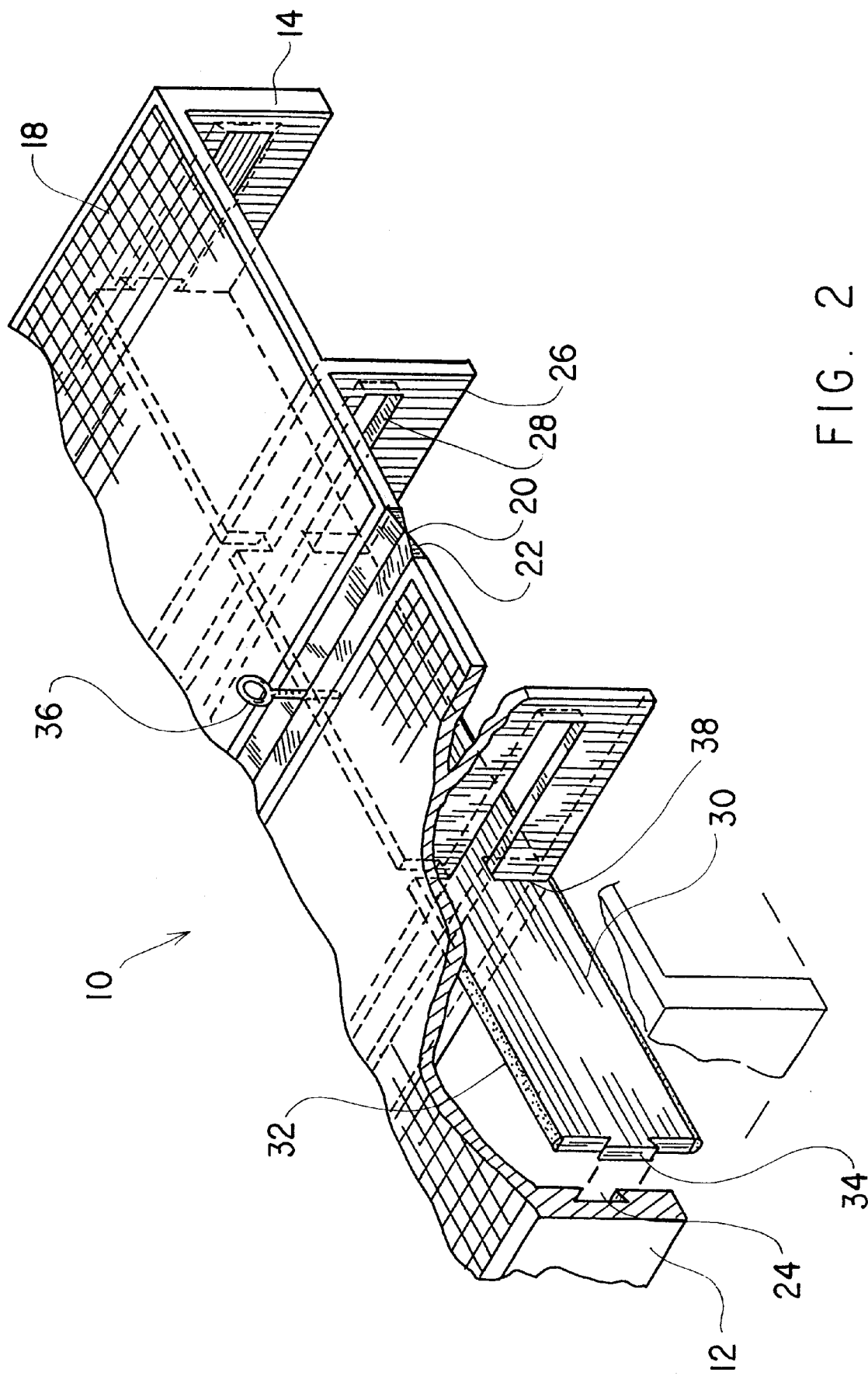
FIG. 2 is a partially cut away perspective view of one of the screen structures of the self-cleaning undergravel filter of the present invention with a side member removed.
Figure 3:
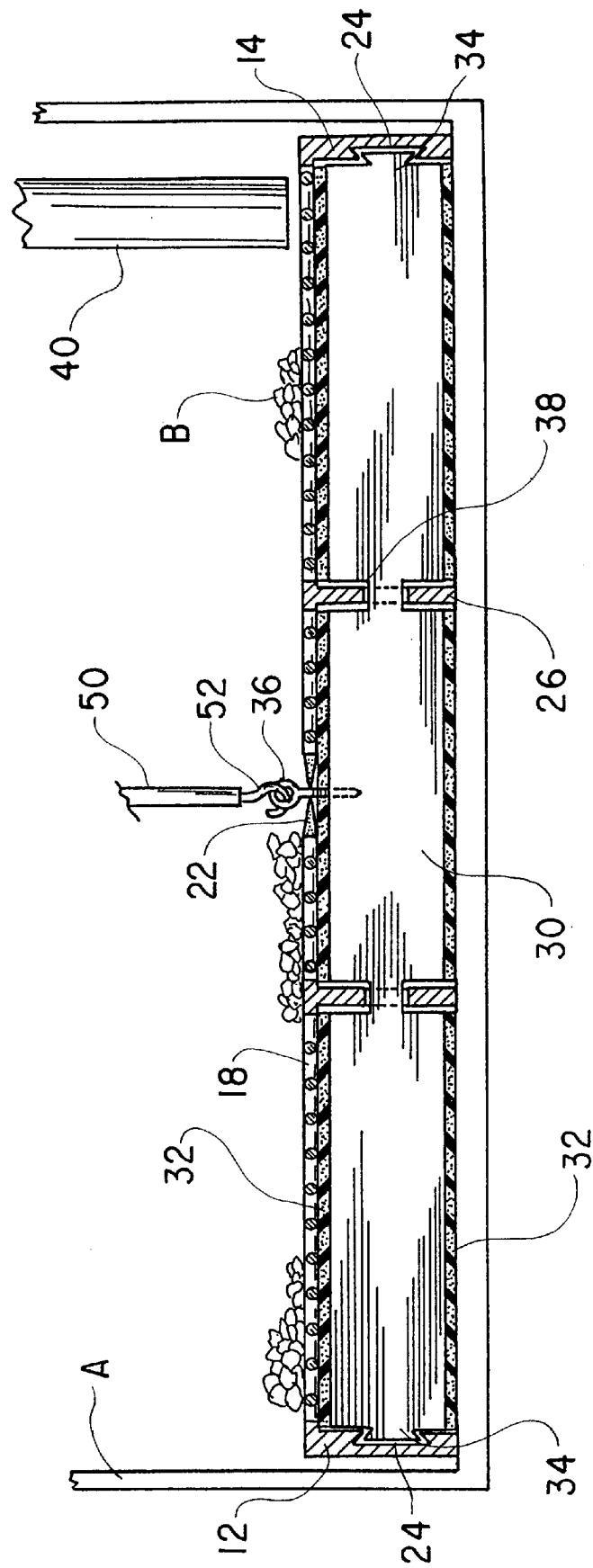
FIG. 3 is a cross sectional view of the self-cleaning undergravel filter of the present invention as taken along line 3—3 of FIG. 1.

Referring also now to FIGS. 2 and 3, each screen structure 10 includes a front member 12, a rear member 14, and two opposed side members 16 which are joined together to form a rectangular frame which supports a top 18 in spaced relation to the floor of the aquarium A. The top 18 of each screen structure 10 is porous and adapted to support a layer of gravel B thereon so that water and debris may flow down through the gravel B and the top 18 of each screen structure 10. When this occurs, most debris will be collected in the layer of gravel B where it may be converted into non-toxic gases by bacteria therein. The debris not collected in the layer of gravel B will drop through the top 18 of each screen structure 10 into a debris collecting space between the top 18 of each screen structure 10 and the floor of the aquarium A. Over time, debris will build up in the debris collecting spaces, thus requiring such spaces to be cleaned.

In order to deal with this problem, the cleaning elements 30 are slidably supported by the screen structures 10 within the debris receiving spaces. Each cleaning element 30 is substantially rectangular in configuration, extending from the front member 12 to the rear member 14 of a screen structure 10 along an axis parallel to the side members 16 of the screen structure 10. Each cleaning element 30 preferably includes a layer of sponge material 32 attached to the top and bottom edges thereof. Each cleaning element 30 is supported by a screen structure 10 so that it may slide back and forth between the two side members 16 of the screen structure 10 with the layer of sponge material 32 on each cleaning element 30 resiliently contacting the top 18 of the screen structure 10 and the bottom of the aquarium A.

The means of supporting each cleaning element 30 preferably is provided by a dovetail groove 24 formed horizontally along the inner surface of the front member 12 and the rear member 14 between the opposed side members 16. Each dovetail groove 24 receives a dovetail tongue 34 adapted to slide therein along the longitudinal axis thereof which is formed on the adjacent vertical end of the cleaning element 30.

Additional support for the top 18 of each screen structure 10 and for each cleaning element 30 may be provided by two guide rails 26 attached to the underside of each screen structure 10 between the two side members 16 thereof. The guide rails 26 form elongate and generally rectangular plates which are laterally spaced and parallel to each other and to the front member 12 and the rear member 14 of the screen structure 10 to which they are attached. Each guide rail 26 extends substantially the entire length of the screen structure between the side members, leaving a space between the end of the guide rail 26 and the side member 16 to allow accumulated debris to flow freely in the debris collecting space. Each guide rail 26 has a slot 28 formed therethrough extending horizontally along the length thereof. The slots 28 in each guide rail 26 on a screen structure 10 are aligned with each other and with the dovetail grooves 24 formed on the front member 12 and rear member 14 of the screen structure 10. Each slot 28 receives a notched portion 38 of the cleaning element 30 therethrough. Each notched portion 38 of the cleaning element 30 is defined by a pair of vertically aligned notches formed in top edge and the bottom edge of the cleaning element so that the sides of the guide rail 26 are engaged by the notches formed in the cleaning element 30.

Figure 4:
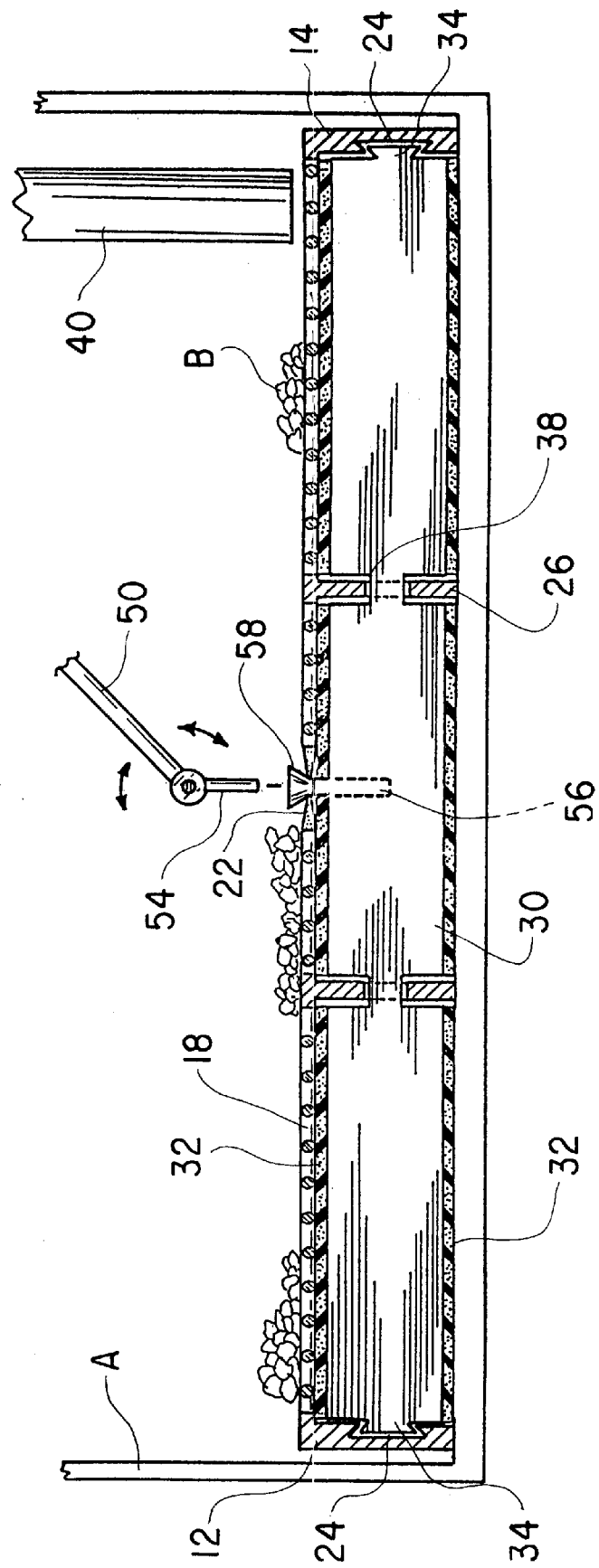
FIG. 4 is a cross sectional view of an alternative embodiment of the self-cleaning undergravel filter of the present: invention as taken along line 3—3 of FIG. 1.

In order to move the cleaning element 30 back and forth within the debris receiving space, each cleaning element 30 has an actuating member in the form of a loop 36 attached to the top edge thereof and extending upwardly therefrom. Alternatively, a funnel-like guide or collar 58 leading to an aperture 56 defined by the top edge of the cleaning element 30 is provided, as seen in FIG. 4. The guide collar 58 is for directing a specially adapted handle 5C into the aperture 56, as described more fully later. A slit 20 is formed through the top 18 of each screen structure 10 in alignment with each loop 36 or collar 58, thereby allowing the loop 36 or collar 58 to protrude through the tops 18 of each screen member 10. Each slit 20 extends the length of the screen structure 10 between the two side members 16 and generally parallel to the front member 12 and rear member 14 thereof.

A pair of resilient flaps 22 are attached to opposed longitudinal edges of the slit 20 in the top 18 of each screen structure 10 along the entire length thereof. The flaps 22 are adapted to contact each other in the middle of the slit 20 to prevent gravel from falling through the slit 20 into the debris receiving space 30, and, to flex around the loop 36 or collar 58 disposed therethrough.

This arrangement allows an elongate handle 50 having a hook 52 or, alternatively as shown in FIG. 4, a pivotable pin 54, disposed on the distal end of the handle 50 to be used to slide each cleaning element 30 back and forth within the debris collecting space. The hook is used to grasp the loop 32 as shown in FIG. 3, whereas the pin 54 is adapted for frictional fit within the aperture 56 in the top of the cleaning element shown in FIG. 4. As the cleaning element is moved, debris will be wiped off the top 18 of the screen structure 10 and the bottom of the aquarium A, and pushed along in front of the cleaning element 30 toward one of the side members 16 of the screen structure 10.

After this debris has been pushed toward one of the side members 16 of a screen structure 10, it must be removed from the debris collecting space. In order to accomplish this, a suction tube 40 is fixedly attached to the top 18 of each screen structure 10 adjacent a side member 16 thereof, as illustrated in FIG. 1. Each suction tube 40 has an inlet disposed in said debris receiving space and an outlet connected to a suction generating means such as a siphon pump or a side mounted aquarium filter so that water and debris pushed toward the side member 16 by the cleaning element 30 may be drawn from the debris collection area for disposal and/or cleaning.

It is to be understood that the undergravel filter system 5 of the present invention is not limited to the embodiment described above, but encompass any and all embodiments within the scope of the following claims.

I claim:

1. A filter system for a water filled tank, said filter system comprising:
   a base screen structure for supporting gravel while allowing water and debris to pass therethrough, having
      a support structure having front, rear, and opposing side members;
      a porous top attached to and supported by said support structure for defining a debris collection space between said porous top and tank floor; wherein said porous top further defines a longitudinal slit parallel to said front and rear members and extending between said opposed sides;
   a means for removing water and debris from said debris collection space; and
   a cleaning mechanism having:
      a cleaning element defining front and rear vertical edges, each slidably engaged with said front and rear support members respectively, a top horizontal edge in contact with said porous top, and a bottom horizontal edge for contact with the tank floor;
      an actuating member, extending upwards through said slit of said porous top; and
      a detachable elongate handle having a proximal end configured for gripping by a person and a distal end removably attached to said actuating member of said cleaning element for sliding along the length of the tank floor.

2. The filter system according to claim 1, wherein said actuating member of said cleaning element forms a loop and said distal end of said handle forms a hook for grasping said loop.

3. The filter system according to claim 1, wherein
   said actuating member of said cleaning element comprises an aperture in said cleaning element aligned with said slit of said porous member and a collar protruding through said slit; and
   said distal end of said handle includes a pin mounted to said distal end for pivotable movement wherein said pin is sized for frictional fit within said aperture of said actuating member.

4. The filter system according to claim 1, wherein said slit formed through said porous top is defined by opposed longitudinal edges, each of said opposed longitudinal edges having a flexible and resilient flap attached thereto along the entire length thereof, wherein each of said flaps has a proximal edge attached to one of said longitudinal edges of said slit and a distal edge disposed between said opposed longitudinal edges of said slit, said distal edges of said flaps being in contact with each other along their entire lengths to prevent debris from falling through said slit, but allowing said actuating member to pass therebetween.

5. The filter system according to claim 1 wherein said top edge and said bottom edge of said cleaning element are formed of a sponge material.

6. The filter system according to claim 1 wherein said front member and said rear member each have an elongate dovetail groove formed therein extending horizontally between said side members, said dovetail groove formed in said front member being aligned with said dovetail groove formed in said rear member; and wherein said vertical ends of said cleaning element each have a dovetail tongue formed thereon which is adapted to interfit with said dovetail groove formed in said front member and said rear member of said screen structure to slidably support said cleaning element within said debris receiving space.

7. The filter system according to claim 6, wherein at least two elongate guide rails are fixedly attached to said screen structure within said debris receiving space, said elongate guide rails being laterally spaced and generally parallel to each other, each of said guide rails extending substantially the entire length between said side members of said screen structure defining a space between each end of said guide rail and said side member for allowing passage of debris, each of said guide rails having an elongate slot formed therethrough extending horizontally between said side members of said screen structure, said slots formed through said guide rails being aligned with each other and said dovetail grooves formed in said front member and said rear member of said screen structure; and wherein said cleaning element has at least two notched portions each defined by a first notch formed in said top edge of said cleaning element and a second notch formed in said bottom edge of said cleaning element in vertical alignment with said first notch, said notched portions being aligned with said dovetail tongues formed on the longitudinal ends of the cleaning element, each of said notched portions being disposed through one of said slots formed through said guide rails.

8. The filter system according to claim 1 wherein at least two of said screen structures are placed in the bottom of the tank is in side by side relation to each other, each of said screen structures having a means for removing water and debris from said debris collecting space connected thereto and a cleaning element slidably supported therein.

* * * * *